US007493181B2

(12) United States Patent
Erickson et al.

(10) Patent No.: US 7,493,181 B2
(45) Date of Patent: Feb. 17, 2009

(54) UTILIZING AN RFID TAG IN MANUFACTURING FOR ENHANCED LIFECYCLE MANAGEMENT

(75) Inventors: Steven C. Erickson, Rochester, MN (US); Ivory Wellman Knipfer, Rochester, MN (US); Jeffrey George Komatsu, Kasson, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 11/360,348

(22) Filed: Feb. 23, 2006

(65) Prior Publication Data

US 2007/0198113 A1    Aug. 23, 2007

(51) Int. Cl.
*G06F 19/00* (2006.01)
(52) U.S. Cl. .................. 700/95; 700/115; 340/572.1
(58) Field of Classification Search .................. 700/95, 700/115–116, 215; 235/376–377, 385; 340/572.1
See application file for complete search history.

(56) References Cited

U.S. PATENT DOCUMENTS

| | | | | |
|---|---|---|---|---|
| 6,351,684 | B1 * | 2/2002 | Shirley et al. | 700/121 |
| 6,546,304 | B2 * | 4/2003 | Thorvaldsson et al. | 700/115 |
| 6,901,304 | B2 | 5/2005 | Swan et al. | |
| 6,941,184 | B2 * | 9/2005 | Ebert | 700/115 |
| 2003/0102367 | A1 * | 6/2003 | Monette et al. | 235/376 |
| 2003/0227392 | A1 * | 12/2003 | Ebert et al. | 340/825.49 |
| 2005/0131763 | A1 | 6/2005 | Junger | |
| 2005/0193222 | A1 | 9/2005 | Greene | |

OTHER PUBLICATIONS http://www.rfidinternational.com/news.php?action=full_news&NewsID=5, "Manufacturing & Supply Chain Solutions RFID", pp. 1-3.
Achilleas Anagnostopoulos, "The RFID Filesystem Whitepater", pp. 1-10, http://www.spinellis.gr/ismr/hof/05-aa-report.pdf.
http://www.rfidnews.org/news/2004/10/05/matsushita-develops-rfid-sd-memory-card, "Matsushita Develops RFID SD Memory Card", pp. 1-2.

* cited by examiner

*Primary Examiner*—Zoila E Cabrera
(74) *Attorney, Agent, or Firm*—Bret J. Petersen; Martin & Associates, LLC

(57) ABSTRACT

A method and apparatus dynamically store data associated with supply chain events for a manufactured assembly to enhance lifecycle management of the assembly. The supply chain events for the manufactured assembly are stored on an RFID tag attached to the assembly as it travels through the supply chain to insure the data concerning the assembly is readily available and not separated from the assembly. The supply chain events or characteristic data may be stored on the RFID tag in a hierarchical structure beginning with the original state of the assembly and with additional entries for each step in the assembly process. In addition, as the product undergoes rework, conversion to a different assembly, or personalization, the new state of the assembly is stored in the RFID tag. Other information that may be stored on the RFID tag includes country of origin, failure data, cycle times and a quality status parameter.

4 Claims, 5 Drawing Sheets

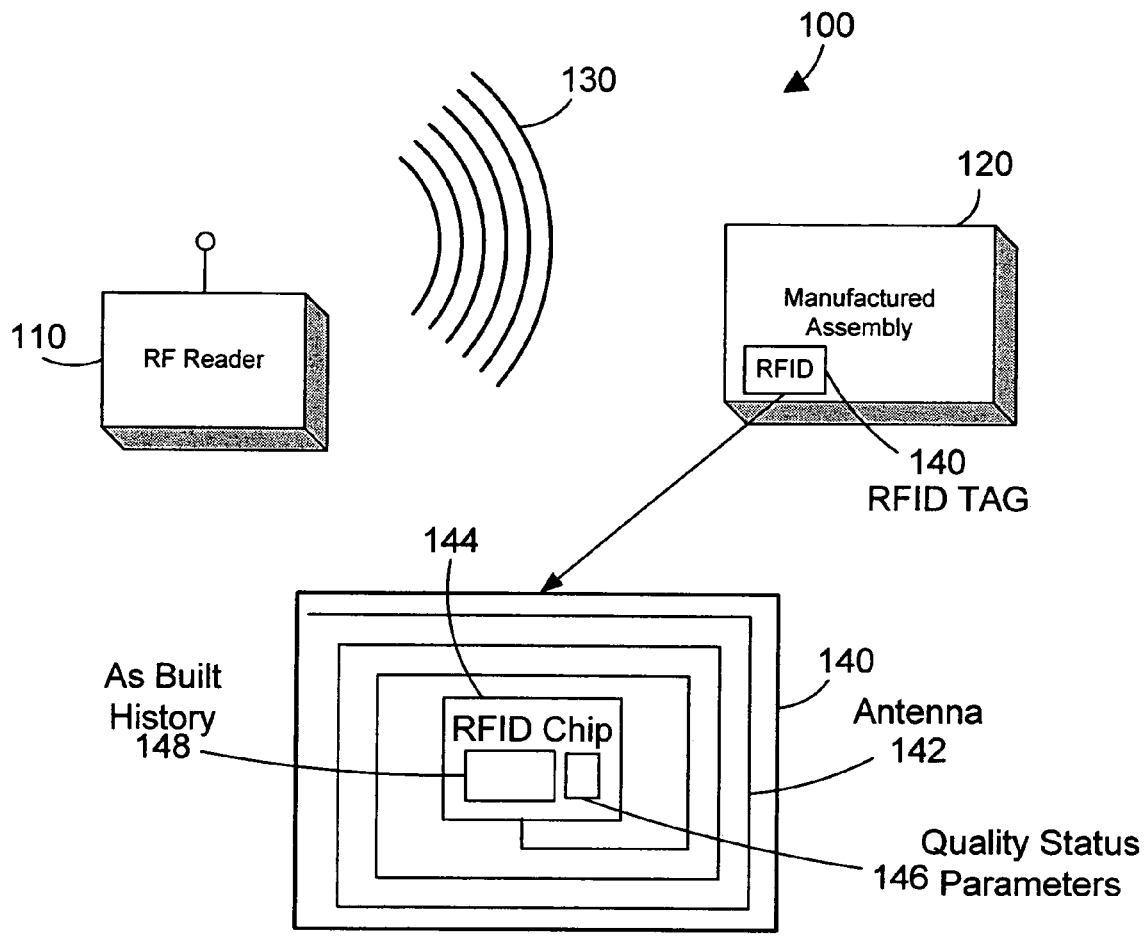

| | Vendor ID 210 | Part Number 220 | Serial Number 230 | Date/Time 240 | Content 250 |
|---|---|---|---|---|---|
| 360 | Vendor A | PN 12345 | SN 12345 | 03.24.2005 10:25:32 | <Content List> |
| 362 | Vendor B | PN 54321 | SN 54321 | 03.27.2005 13:35:22 | <Content List> |
| 364 | Vendor C | PN 67890 | SN 67890 | 04.28.2005 23:30:00 | <Content List> |
| 366 | Vendor C | PN 67890 | SN 67890 | 04.28.2005 23:45:17 | <Content List> |
| 368 | Vendor D | PN 12345 | SN 09876 | 05.15.2005 03:00:08 | <Content List> |
FIG. 5
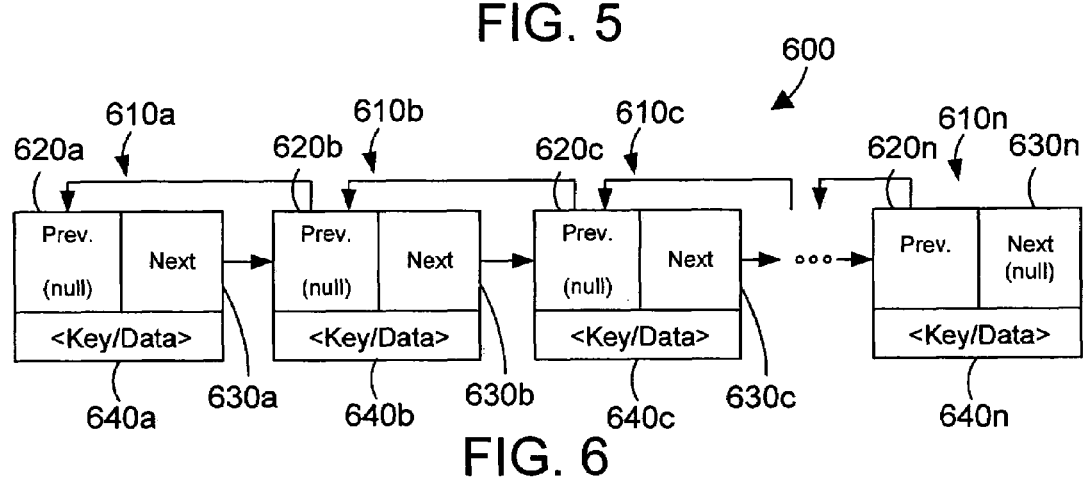
FIG. 6
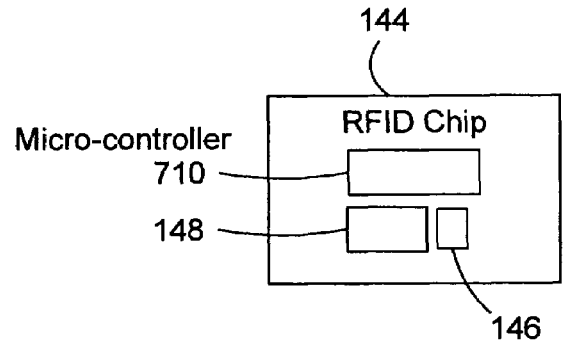
FIG. 7

UTILIZING AN RFID TAG IN MANUFACTURING FOR ENHANCED LIFECYCLE MANAGEMENT

TECHNICAL FIELD

This invention generally relates to RFID tags, and more specifically relates to utilizing an RFID tag in a manufacturing environment and an improved method and apparatus to store historical data on the RFID tag for enhanced lifecycle management.

BACKGROUND ART

Through strategic product outsourcing, manufacturers continue to drive more and more manufacturing and product content to vendors that specialize in certain technologies. This product outsourcing allows primary manufacturers to specialize in technologies that provide the most value added content to their customers. A manufactured assembly may consist of multiple levels of assemblies and part numbers produced by several vendors in the chain of producing the assembly. Further, due to errors in supply/demand planning, order skew, configuration variability, as well as product defects, a manufacturer may need to change or re-personalize many of the purchased assemblies. In order to re-personalize or re-configure the assemblies it is important for the manufacturer to know exactly the current state as well as the history of the assembly.

Manufacturers may require its vendors to create a hierarchal data structure of the assemblies and supply the data to the manufacturer. The data is typically placed in a database. The data can then be used to reconfigure the product assemblies and the database updated to reflect the reconfiguration. This solution is costly and the product identity of previous subassemblies can be lost due to product reconfiguration. If an item is returned to the original vendor, there may be no original part number identification on the assembly for the vendor to verify its own assembly, which may require the manufacturer to search its records to prove the vendor is the original manufacturer of the assembly.

RFID tags are commonly used in the manufacturing industry to track and identify goods throughout the manufacturing process and for shipment to customers. RFID tags are similarly used by the end retailers. However, when RFID tags have been utilized in the manufacturing process, they have been used to only record "point in time" data, or the current status of the assembly. FIG. 2 shows a data record 200 for a prior art RFID tag. The data record shows the current state of the assembly by showing the part number 210, serial number 220 and other content 230. The information stored on the typical RFID tag as shown in FIG. 2 does not record the historical activities performed on the assembly and hierarchal information of the assembly such as the changing part number. This additional information is typically supplied to the manufacturer in a database format from the various vendors as described above.

Without a way to manage the history of a manufactured assembly through the lifecycle of the assembly in a complex supply chain, manufacturers will continue to bear the high costs of maintaining data from multiple vendors and other costs associated with re-configuring product assemblies.

DISCLOSURE OF INVENTION

Some embodiments herein describe a method and apparatus to store the supply chain events for a manufactured assembly. In some embodiments, the supply chain events for the manufactured assembly are stored on an RFID tag attached to the assembly as it travels through the supply chain to insure the data concerning the assembly is readily available and not separated from the assembly.

In other embodiments, the supply chain events or characteristic data is stored on the RFID tag in a hierarchical structure such as a dynamically linked list, where data is stored beginning with the original state of the assembly and additional entries are added for each step in the assembly process. In other embodiments, as the product undergoes rework, conversion to a different assembly, or personalization, the new state of the assembly is stored in the RFID tag in addition to previously-stored information. In other embodiments, other information is also stored on the RFID tag such as country of origin, failure data, cycle times and one or more quality status parameters.

The foregoing and other features and advantages of the invention will be apparent from the following more particular description of some embodiments of the invention, as illustrated in the accompanying drawings.

BRIEF DESCRIPTION OF DRAWINGS

Embodiments of the present invention will hereinafter be described in conjunction with the appended drawings, where like designations denote like elements, and:

FIG. 1 is a block diagram of one embodiment of an RFID Tag used with an RFID tag reader;

FIG. 2 is another system block diagram of RFID tag data according to the prior art;

FIG. 5 is a table of data representing an as built history according to an embodiment;

FIG. 6 is a block diagram of a dynamically linked list for storing an as built history according to an embodiment;

FIG. 7 is a block diagram of an RFID chip according to an embodiment;

DETAILED DESCRIPTION

Figure 3:
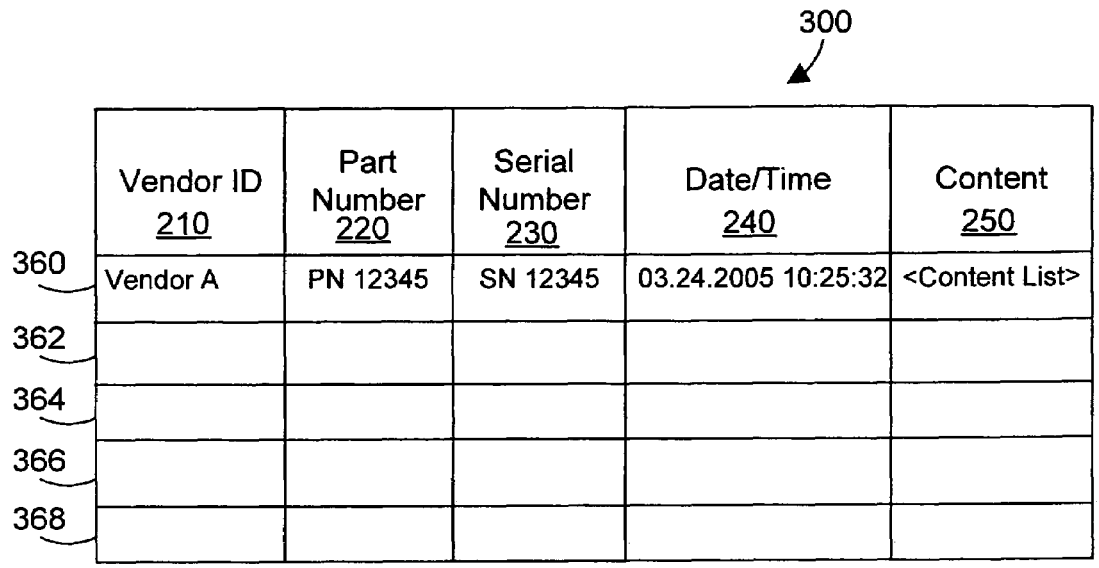
FIG. 3 is a table of data representing an as built history according to an embodiment.

The present invention relates to an apparatus and method to utilize an RFID tag in manufacturing. FIG. 1 shows a block diagram that represents one embodiment of an RFID tag in a manufacturing environment. An RFID reader 110 in this embodiment communicates with a manufactured assembly 120 with an RFID signal 130 to an RFID tag 140 located on the assembly 120. The RFID tag 140 includes an antenna 142 to receive the RFID signal 130 to activate and communicate with the RFID chip 144. In some embodiments, the RFID chip 144 includes one or more quality status parameters 146 and an as built history 148 to store data associated with supply chain or manufacturing events to create a hierarchical history of the manufactured assembly 120. A manufacturing event is recorded for each significant change in the status of the assembly, such as adding a new sub-assembly or performing a manufacturing step on the assembly.

Again referring to FIG. 1, the quality status parameters 146 are similar to manufacturing events, but are specifically used to indicate quality control parameters of the assembly. In one embodiment, the quality status parameters include a usability indicator to indicate an overall good/bad status of the part. Data associated with the usability indicator can give specific information about the quality issues for the assembly. The usability indicator and other quality control parameters are used to quickly determine the status of the assembly to control movement and disposition of the assembly through the manufacturing process. This feature embeds the usability of an assembly with the RFID tag attached to the assembly to insure the status is not lost with assembly paperwork. Further the quality status parameters 146 can be easily passed between vendors in the supply chain.

Figure 4:
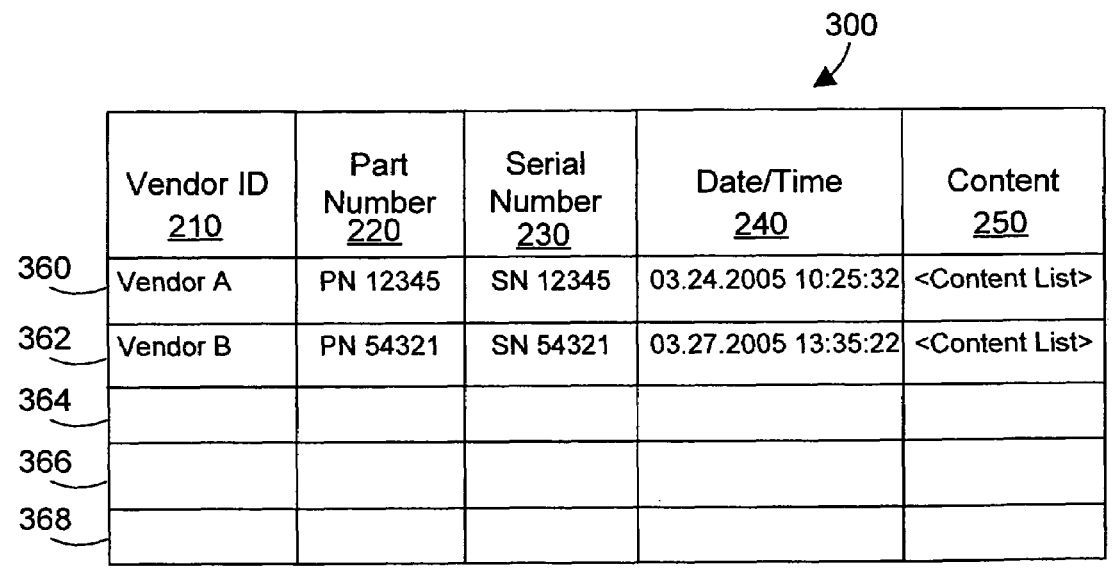
FIG. 4 is a table of data representing an as built history according to an embodiment.

According to one embodiment, supply chain events for a manufactured assembly are stored on the RFID tag 140 attached to the assembly as it travels through the supply chain to insure the data concerning the assembly is readily available and not separated from the assembly. FIGS. 3-5 illustrate an example of an as built history 148 shown in FIG. 1. In this example, the as built history is represented as a table 300 of data that is stored on the RFID chip 144. In this example, the as built history table 300 includes a vendor ID 310, part number 320, serial number 330, data/time 340 and content of the history entry 350. Each entry 360, 362, 364, 366, 368 of the table is data for a unique manufacturing event. The content of the history entry contains other data associated with the assembly for the manufacturing event. This other data could include the country of origin, the part cost, a commodity code, revision of embedded code, part description, etc.

Again referring to FIG. 3, when a first assembly or subassembly is built an RFID tag is attached to the assembly by the vendor. The as built history table 300 in the RFID tag is initially loaded by the first vendor in the supply chain to start the as built history of the assembly. The first vendor (Vendor A) records data in the first entry 360 in the table 300 as shown in FIG. 3. In this embodiment, when a vendor makes changes or additions to an assembly, all the data in the table 300 is read and stored in the RF reader 110 (FIG. 1), new data is appended to the read data and then the combined data is loaded into the table. This read and then re-write process is necessary when the RFID tag has a flash memory that is written to as a single block. Thus, in the illustrated example, Vendor B reads the data in the first record 360, concatenates data for a new entry, and stores the data into the as built history 300. The table 300 then has the first entry 360 restored back into the first position in the table, as well as the new second entry 362 stored in the second position as shown in FIG. 4. In this manner the supply chain events are stored on the RFID tag in a hierarchical structure beginning with the original state of the assembly and with additional entries for each step in the assembly process. An example of a completed table 300 of data for an assembly is represented in FIG. 5 which has three additional entries 364, 366, 368. The part number and serial number of the entries change to reflect the changing nature of the assembly as sub-assemblies are added and manufacturing steps are applied to the assembly.

The method described with reference to FIGS. 3-5 requires each vendor application accessing the data on the RFID tag to concatenate any new data with previous data storing the concatenated data back into the as built history table 300. This embodiment solves some of the problems described with reference to the prior art, but it requires that each supplier's application concatenate and reload the data. Further, this method does not ensure the integrity of the hierarchal history will be maintained as described in the embodiments described below.

FIG. 6 illustrates a linked list data structure 600 to store the as built history 148 (FIG. 1) according to other embodiments.

When a vendor makes changes or additions to an assembly, the data in the RFID chip 144 can be read for reference, but any existing data is not modified, and new data is appended to the existing data using the linked list 600. The linked list has multiple records 610, which each have a previous link 620, a next link 630 and a data field 640. The previous link 620$a$ of the first record 610$a$ and the next link 630$n$ of the last record 610$n$ are coded as a null link to indicate the beginning and end of the linked list respectively. The data field 640 of each record 610 is loaded with the data of a single entry in the as built history table 300 as described above with reference to FIGS. 3-5. For example, the data field 640$a$ in the first record 610$a$ is loaded with the data shown in first data entry 360 in FIG. 5 and the second data field 610$b$ is loaded with the data shown in the second data entry 362. The other data fields are loaded in a similar manner so that the linked list contains the data in a hierarchal structure based on the sequence the records were added to the linked list by one or more vendors. These embodiments are desirable because the dynamic list management function protects suppliers from updating each other's information. Moreover, by separating the append/add content function from the existing supplier history, the history data is not exposed to other application changes and preserves integrity of the history.

FIG. 7 illustrates an RFID chip 144 to implement the linked list described in FIG. 6. The RFID chip 144 includes a micro-controller 710 to process commands from the RFID reader (110 FIG. 1). The micro-controller is a low power, small instruction set micro-controller or state machine that gives the RFID controller a limited processing capability to respond to commands from the RFID reader. The commands instruct the RFID chip to manage the dynamic linked list described above to allow the reader to selectively write records to the linked list rather than writing the whole as built history at once in the manner described in the previous embodiment.

In some embodiments, the linked-list capability described with reference to FIG. 6 maybe implemented using four instructions: Initialize Data Storage, Add Data to Head of List, Read head Node, and Clear Entire List. In these embodiments, the Initialize Data Storage instruction is recognized by the RFID tag as a command to initialize the storage memory area. This initialization process may include establishing the addressing for the record/node size specified and setting the head node address in a protected memory space. The Add Data to Head of List instruction is recognized by the RFID tag as a command to add the current data to the RFID tag as an append function. This process, in turn, may include determining the memory address for the head node, appending the current data, and resetting/saving the head node address. The Read head Node instruction is recognized by the RFID tag as a command to show the current head node data only. This may include looking looks up the node (size) for the head node address and broadcasts that specific node data. The Clear Entire List instruction is recognized by the RFID as a command to re-flash the RFID to an empty undefined list.

Figure 8:
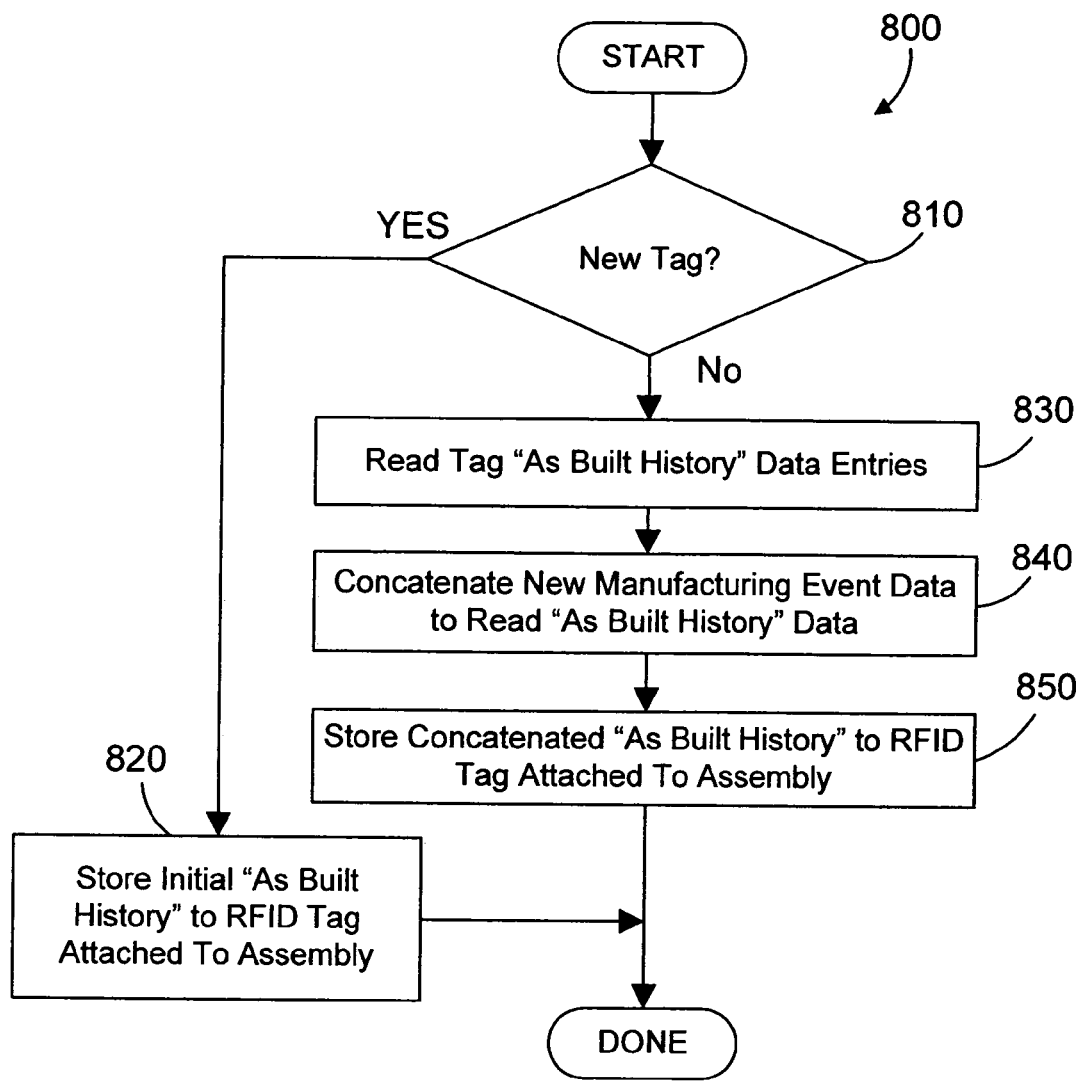
FIG. 8 method diagram for storing an as built history according to an embodiment.

FIG. 8 shows a method 800 for storing an "as built history." If the RFID tag is a new tag being placed on a new first assembly (step 810=yes) then the initial vendor information and assembly information is stored on the RFID tag attached to the assembly (step 820). The RFID tag need not be directly attached to the assembly but is associated with the assembly, such as attached to the packaging. If the RFID tag is not a new tag (step 810=no) then the complete as built history stored on the RFID tag is read into the RFID reader (step 830). The new manufacturing event is concatenated with the as built history read from the RFID tag (step 840) and the concatenated as built history is stored to the RFID tag attached to the assembly (step 850). The method is then done.

Figure 9:
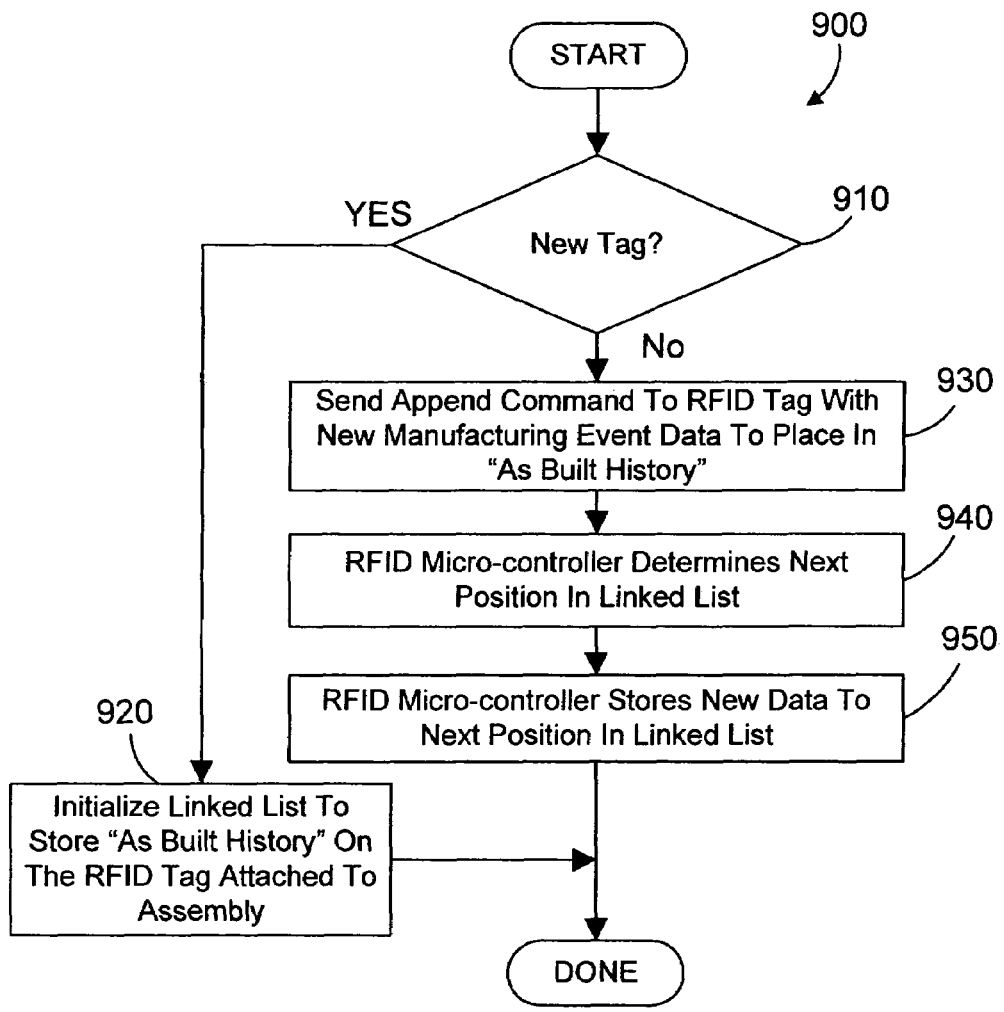
FIG. 9 method diagram for storing an as built history according to another embodiment.

FIG. 9 shows another method 900 for storing an "as built history." If the RFID tag is a new tag being placed on a new first assembly (step 910=yes) then a linked list is initialized on the RFID tag attached to the assembly and the initial vendor information and assembly information is stored in the linked list (step 920). The RFID tag need not be directly attached to the assembly but is associated with the assembly, such as attached to the packaging. If the RFID tag is not a new tag (step 910=no) then an append command is sent to the RFID tag with the new manufacturing event data to place in the as built history (step 930). The RFID micro-controller determines the next position in the linked list (step 940) and new data is stored in the next position of the linked list of the built history on the RFID tag attached to the assembly (step 950). The method is then done.

As described above, embodiments provide a method and apparatus to store the supply chain events for a manufactured assembly. In some embodiments, the supply chain events for the manufactured assembly are stored on an RFID tag attached to the assembly as it travels through the supply chain to insure the data concerning the assembly is readily available and not separated from the assembly. In this way, supply chain actions, such as "rework", "conversion to a different assembly", or "personalization(s)" to the content is appended to the information stored on the assembly itself. By providing this historical, updated information on the item itself, the present invention can reduce the cost of information technology infrastructure required to send/receive and store all the changes as they occur in the supply chain, insures data continuity in situations where the final delivery location is unknown and/or not part of a larger data exchange network, and avoids synchronization issues between multiple suppliers in the supply chain. In addition, the method and apparatus described herein provide a way to manage the history of a manufactured assembly in a complex supply chain to reduce the costs of maintaining data from multiple vendors and other costs associated with re-configuring product assemblies.

Although the present invention has been described in detail with reference to certain examples thereof, it may be also embodied in other specific forms without departing from the essential spirit or attributes thereof. For example, those skilled in the art will appreciate that aspects of the present invention are capable of being distributed as a computer program product embodied on a tangible, computer-readable signal bearing medium. Examples of suitable tangible, computer-readable signal bearing media include, but are not limited to: (i) non-writable storage media (e.g., read only memory devices ("ROM"), CD-ROM disks readable by a CD drive, and Digital Versatile Disks ("DVDs") readable by a DVD drive); (ii) writable storage media (e.g., floppy disks readable by a diskette drive, CD-R and CD-RW disks readable by a CD drive, random access memory ("RAM"), and hard disk drives); and (iii) communications media (e.g., computer networks, such as those implemented using "Infiniband" or IEEE 802.3x "Ethernet" specifications; telephone networks, including cellular transmission networks; and wireless networks, such as those implemented using the IEEE 802.11x, IEEE 802.16, General Packet Radio Service ("GPRS"), Family Radio Service ("FRS"), and Bluetooth specifications). Those skilled in the art will appreciate that these embodiments specifically include computer software down-loaded over the Internet.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Moreover, these service engagements may be directed at providing data management services, business process services, or both. Accordingly, these embodiments may further comprise receiving charges from other entities and associating that charge with users of the system.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

What is claimed is:

1. A method for utilizing an RFID tag in manufacturing comprising the steps of:

storing data for an initial manufacturing event in an as built history on the RFID tag associated with a manufactured assembly;

storing additional data for a second manufacturing event into the as built history on the RFID tag, wherein the manufacturing events include a part number and other data for a plurality of prior sub-assemblies that comprise the manufactured assembly;

wherein the step of storing the additional data for the second manufacturing event comprises reading the data for the initial manufacturing event and concatenating the data for the second manufacturing event and storing the concatenated data in a dynamically linked list in the as built history;

wherein the RFID tag comprises a micro-controller to control commands received from the RFID reader to store the plurality of manufacturing events in the dynamically linked list; and wherein the initial and second manufacturing events include a vendor ID, a part number, a serial number, a date and time, a quality status parameter that includes a good/no good indication of the usability of the assembly, and other associated data for each manufacturing event.

2. A computer recordable medium, containing computer executable instructions, that when executed, perform the method of claim 1.

3. A method for utilizing an RFID tag in manufacturing comprising the steps of:

storing data for an initial manufacturing event in an as built history on the RFID tag that is associated with a manufactured assembly;

for each significant change in the status of the manufactured assembly, storing additional data as a new manufacturing event into the as built history on the RFID tag, wherein the significant change includes adding a new sub-assembly to the manufactured assembly;

wherein the new manufacturing event includes a part number and other data for the new sub-assembly;

wherein the step of storing the additional data for the new manufacturing event comprises reading the data for the initial manufacturing event and concatenating the data for the new manufacturing event and storing the concatenated data in a dynamically linked list in the as built history;

wherein the RFID tag comprises a micro-controller to control commands received from the RFID reader to store the plurality of manufacturing events in the dynamically linked list; and wherein the initial and new manufacturing events include a vendor ID, a part number, a serial number, a date and time, a quality status parameter that includes a good/no good indication of the usability of the assembly, and other associated data for each manufacturing event.

4. The method of claim 3 wherein the initial manufacturing event is stored by a first vendor and the new manufacturing event is stored by a second vendor during the manufacturing process of the manufactured assembly.

* * * * *